March 15, 1960 J. CASTELLANA 2,928,316
STEREOSCOPIC SLIDE PROJECTOR
Filed May 24, 1955 6 Sheets-Sheet 1

INVENTOR
Jack Castellana
BY J.A. Grier
ATTORNEY

March 15, 1960 J. CASTELLANA 2,928,316
STEREOSCOPIC SLIDE PROJECTOR
Filed May 24, 1955 6 Sheets-Sheet 2
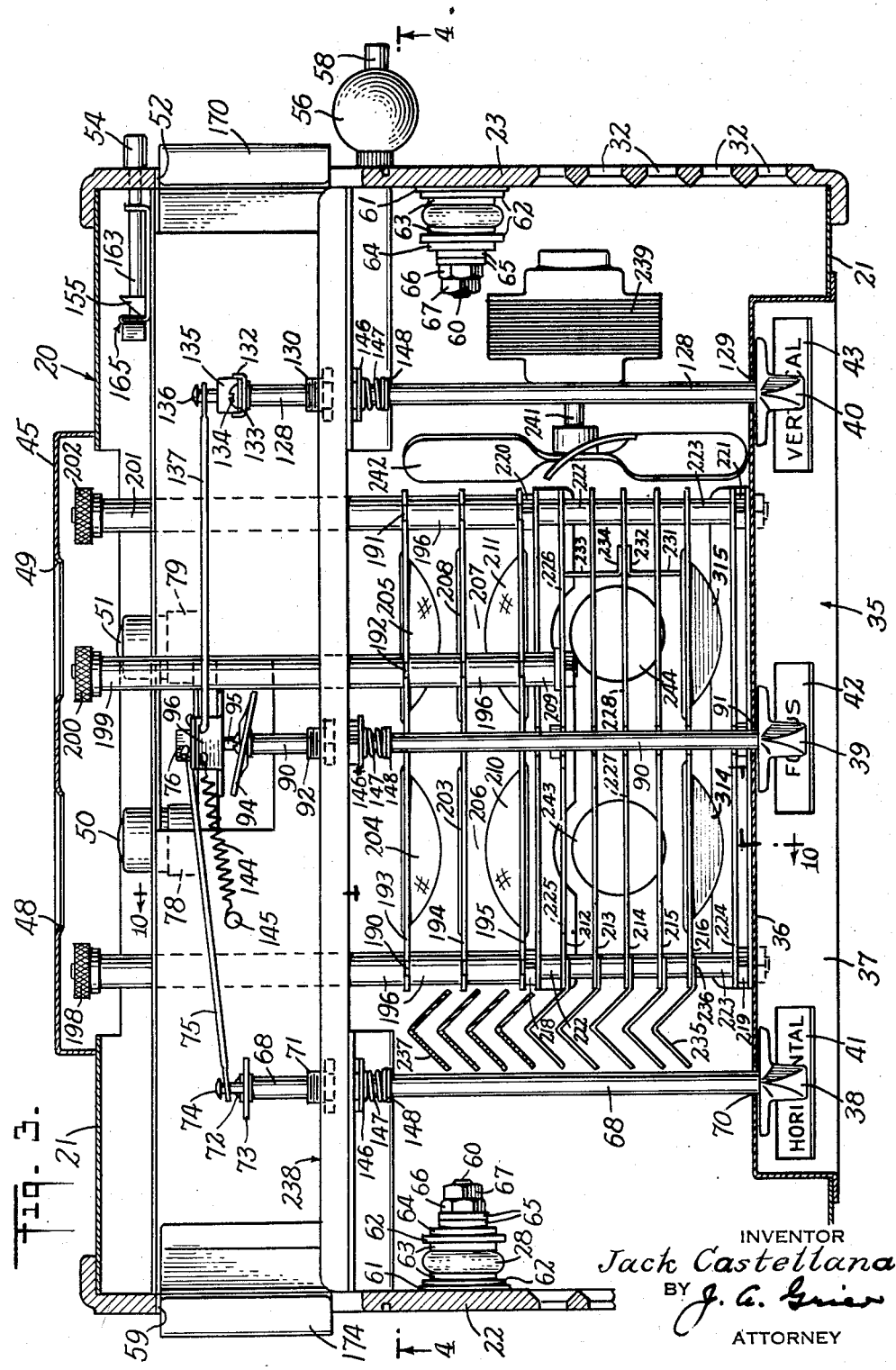
INVENTOR
Jack Castellana
BY
ATTORNEY March 15, 1960
J. CASTELLANA
2,928,316
STEREOSCOPIC SLIDE PROJECTOR
Filed May 24, 1955
6 Sheets-Sheet 3
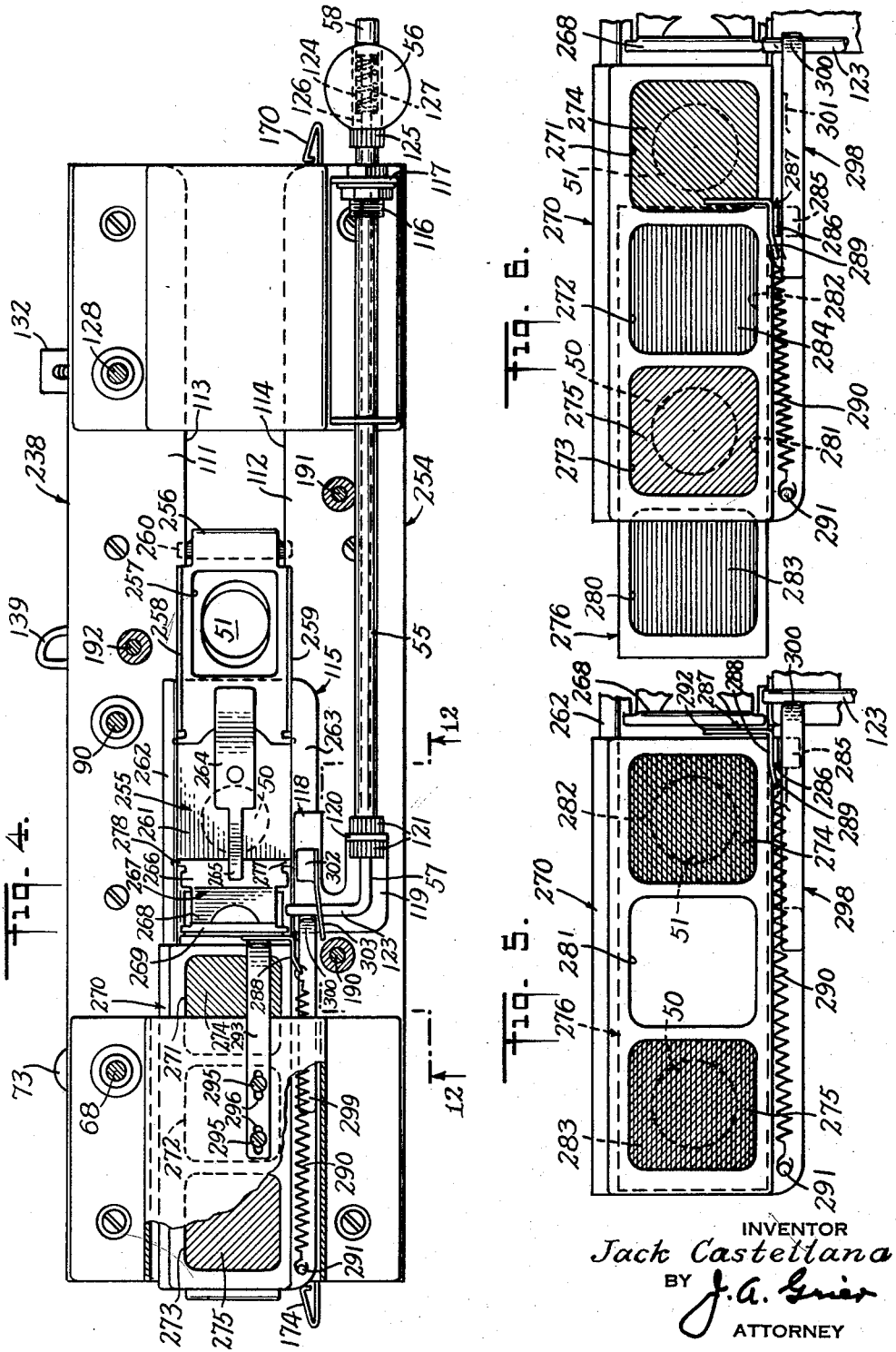
INVENTOR
Jack Castellana
BY J. A. Grier
ATTORNEY March 15, 1960 J. CASTELLANA 2,928,316
STEREOSCOPIC SLIDE PROJECTOR
Filed May 24, 1955 6 Sheets-Sheet 4
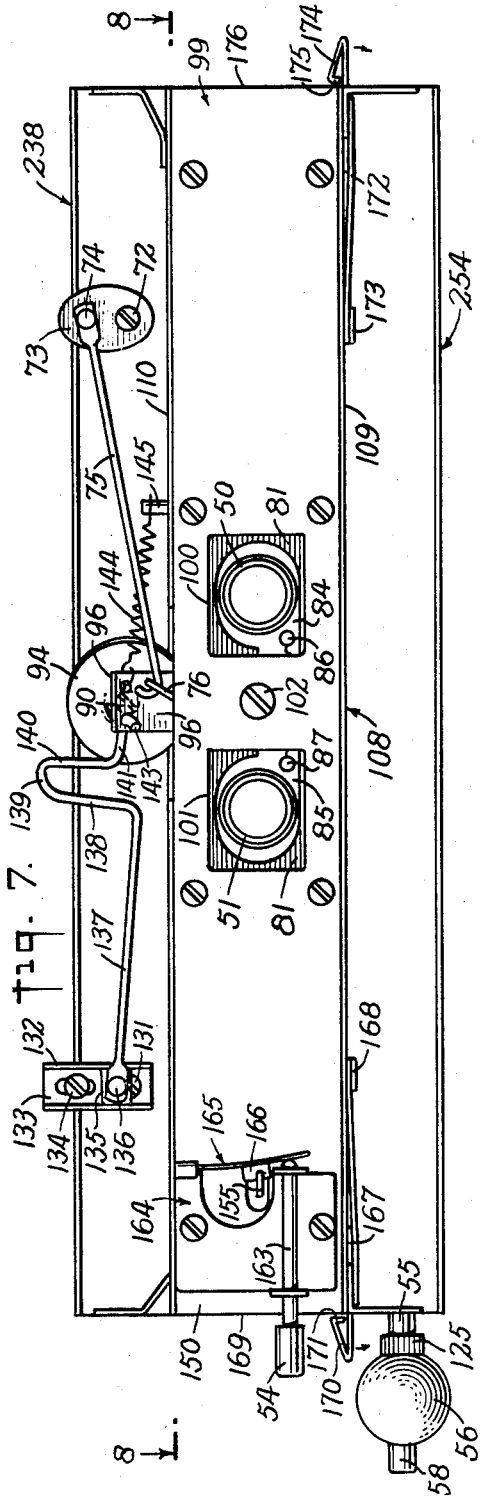
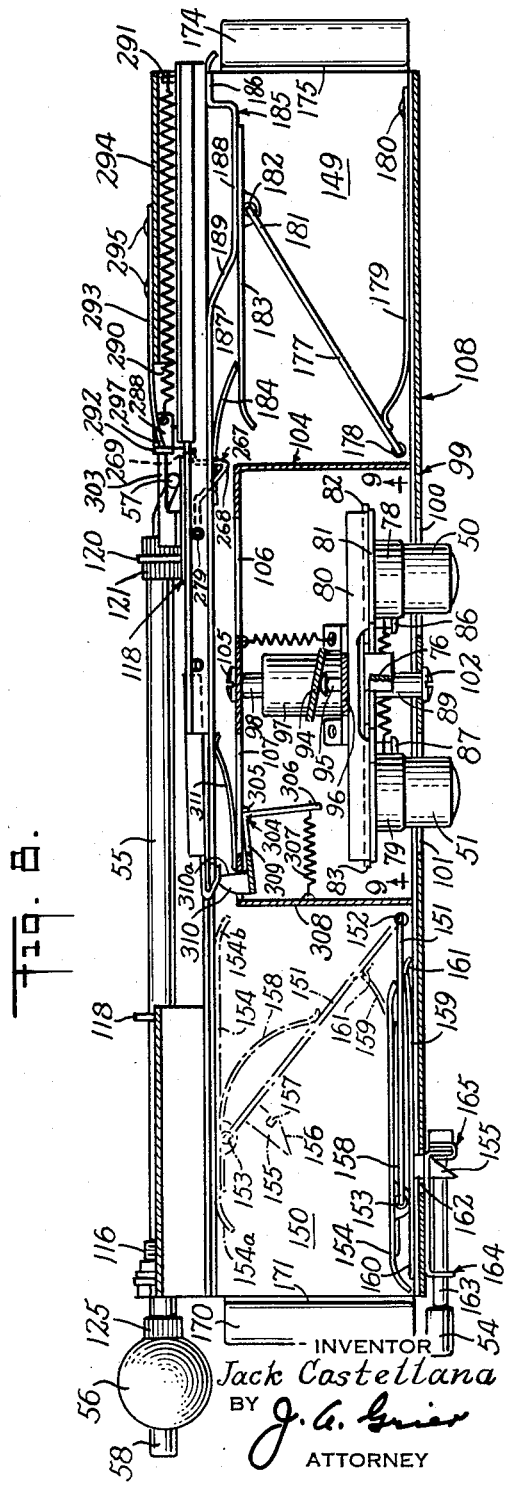
INVENTOR
Jack Castellana
BY J. A. Grier
ATTORNEY

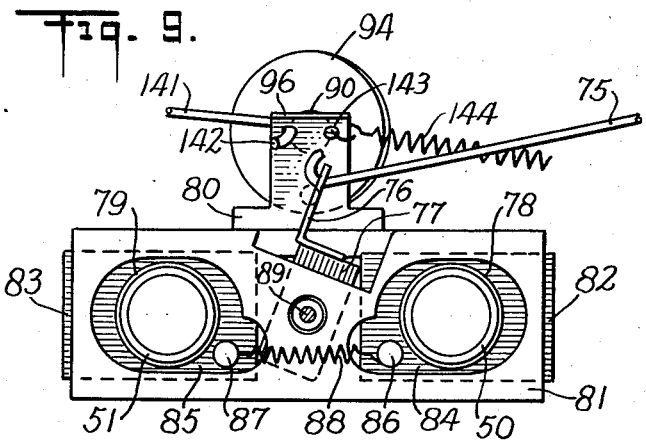
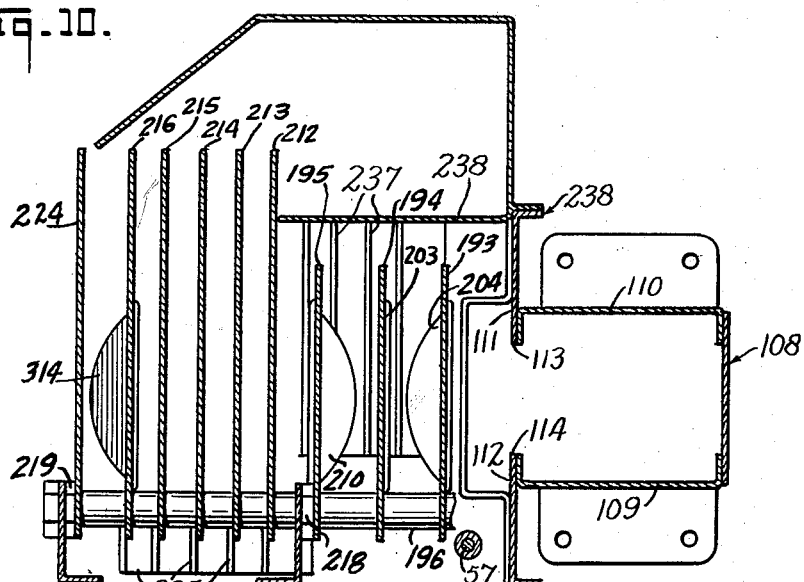
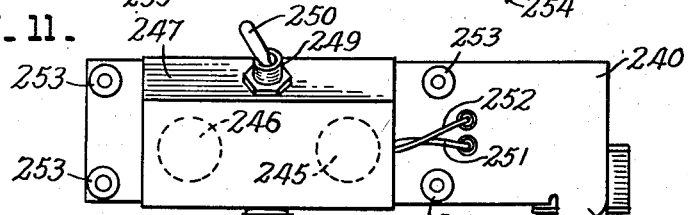
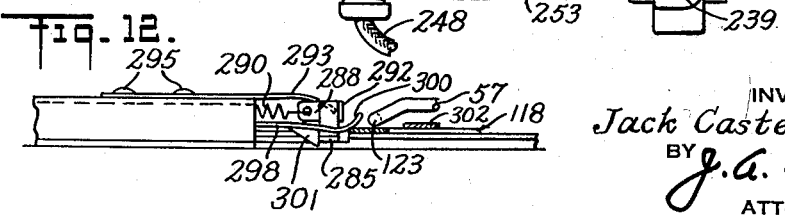

March 15, 1960 J. CASTELLANA 2,928,316
STEREOSCOPIC SLIDE PROJECTOR
Filed May 24, 1955 6 Sheets-Sheet 6
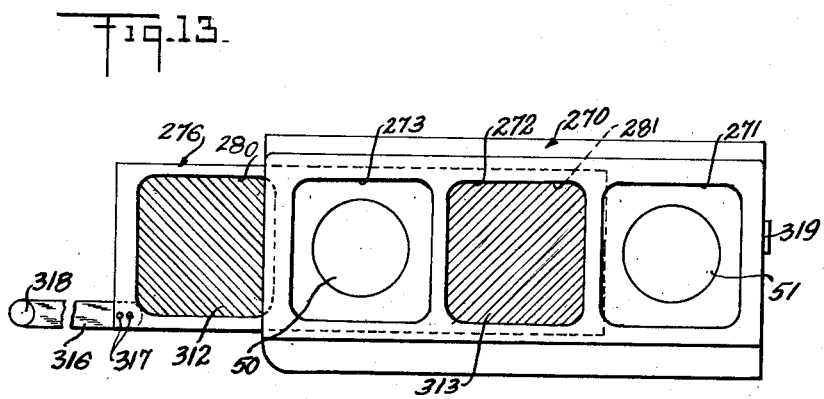
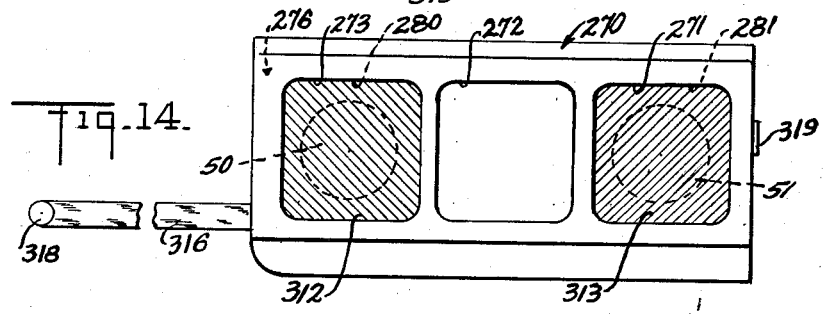
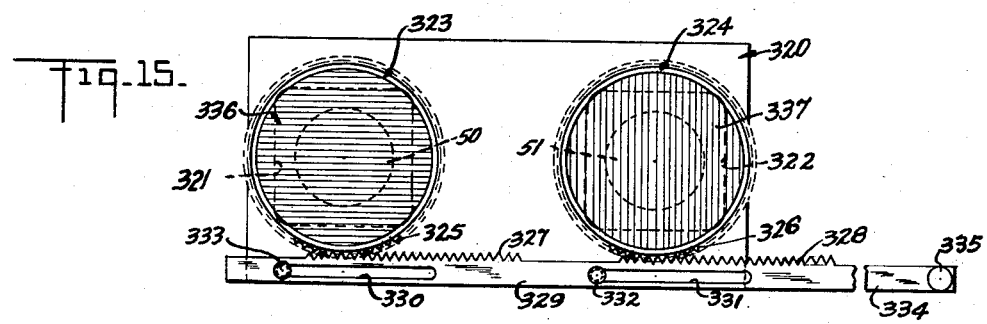
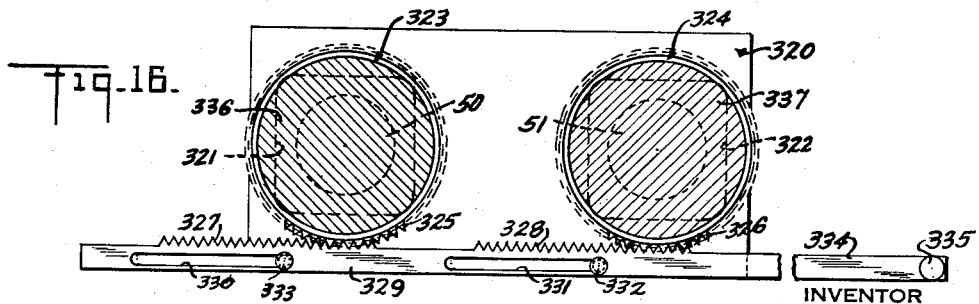
INVENTOR
Jack Castellana
BY
J. G. Grier
ATTORNEY United States Patent Office 2,928,316
Patented Mar. 15, 1960

2,928,316

STEREOSCOPIC SLIDE PROJECTOR

Jack Castellana, New York, N.Y., assignor to Taylor Industries, Inc., a corporation of New York Application May 24, 1955, Serial No. 510,709

4 Claims. (Cl. 88—26)

The purpose of this device is to eliminate eye discomfort which the viewer of a projected stereo image experiences due to the initial misalignment of the stereo pair. The contemporary stereo art requires that when viewing projected images, filters must be used by the observer to produce an optical barrier so that visual separation of the two images results, even though they are both being presented on the same screen surface simultaneously.

Due to mechanical and optical problems which are inherent with both the available picture taking equipment and the subsequent slide mounting, each slide may require vertical superimposition as well as horizontal registration when being projected on a screen. Since the right eye will only see picture A and the left eye will only see picture B, and since the acuity of the human eye is approximately one degree, the eyes are compelled to contort by the angle of misalignment. Since horizontal parallax error is the only correction which the eyes experience normally, vertical compensation becomes most upsetting.

The system herein disclosed eliminates the possibility of the type of eye strain referred to above and present in all other existing machines of this type so far as I am aware, I believe that the herein disclosed apparatus and methods completely solve the problems set forth in the above paragraphs as compared to existing machines of the same character and that the features of the herein disclosed machine are new and novel over the prior art.

This invention relates to slide projectors, and is particularly directed to improvements in the art of projecting stereoscopic picture slides or fibers, and has for an object the provision of a projector in which the original or initial misalignment of the pair of stereo pictures when first thrown upon a screen are prevented from giving the viewer eye discomfort.

Another object of the invention is the provision of a projector in which the positions of the images with respect to the horizontal are adjustable so that the two images may be superimposed upon each other on the screen and the images also being adjustable relative to the vertical so that they may be superimposed in the vertical sense as well as in the horizontal sense.

A further object of the invention is the provision of a stereoscopic projector in which the images projected from a given slide are polarized by filters, and in which auxiliary filters are superimposed upon said images thereby depolarizing them during an adjusting period wherein said images are superimposed upon each other and matched in both a horizontal and vertical sense, said projector including means for removing the auxiliary filters after the adjustment has been completed so that the then polarized images on the screen may be viewed through "Polaroid" glasses with all their splendor.

Other objects and advantages of the invention will be apparent to those skilled in the art upon the study of the specification and the accompanying drawings.

Referring to the drawings which are given by way of example to illustrate the invention:

Figure 1 is a perspective view showing the compartment to conatin slides to be projected, the transport rod for changing slides and for controlling filters in the optical paths in the machine, and showing the apertures in the casing through which the pictures are projected;

Figure 2 is a perspective view taken from the opposite direction to that shown in Figure 1 and showing louvres through which cooling air for the two light sources may pass into the atmosphere, a compartment in the end of the casing for receiving the slides after they have been projected, and a control section set into the casing for adjusting the projected images laterally, adjusting the projected images vertically, and for conjointly focusing both images simultaneously;

Figure 3 is a sectional plan view as seen along the line 3—3 of Figure 2;

Figure 4 is an elevational view of the transport and filter control mechanism, as seen along the line 4—4 of Figure 3;

Figure 5 is a view showing a slide with each of its pictures aligned with an optical system and with the normal polarizing filters aligned therewith and with a second set of depolarizing filters superimposed thereon for adjustment and focusing purposes;

Figure 6 is a view similar to that shown in Figure 5, except that the second set of filters have been shifted off of the optical axes of the two optical systems, thereby projecting the then adjusted pictures through the first or normal set of filters;

Figure 7 is an elevational view showing details of the focusing mechanism and additional details of the slide stacking means in the slide compartments of the device;

Figure 8 is a view taken along the line 8—8 of Figure 7;

Figure 9 is a view taken along the line 9—9 of Figure 8;

Figure 10 is a view taken along the line 10—10 of Figure 3;

Figure 11 is a view of a housing enclosing the electrical connections below the projection lamps;

Figure 12 is a view taken along the line 12—12 of Figure 4;

Figure 13 is a view similar to Figure 6, but modified by omitting the polarizing filters from the optical axes and placing them in the auxiliary filter carrier;

Figure 14 is a view of the arrangement shown in Figure 14 when the filter carrier is moved to a point where the filters carried thereby are on the optical axes;

Figure 15 shows a modified filter arrangement wherein a special filter holder is provided with rotary filters and the latter are shown in non-polarizing positions; and Figure 16 shows the filters after they have been rotated through angles of 90° to polarizing positions.

Figure 1:
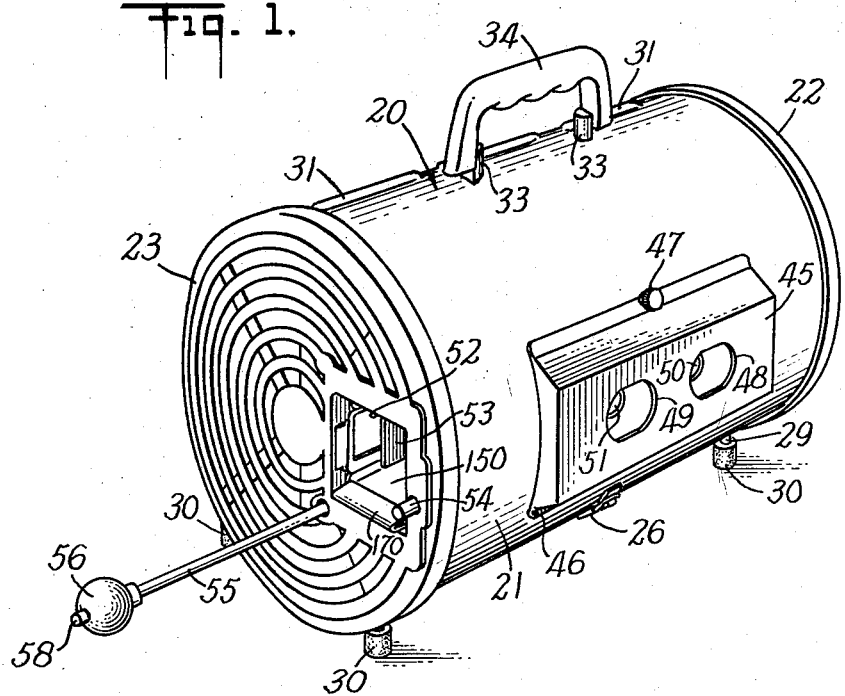
Figure 2:
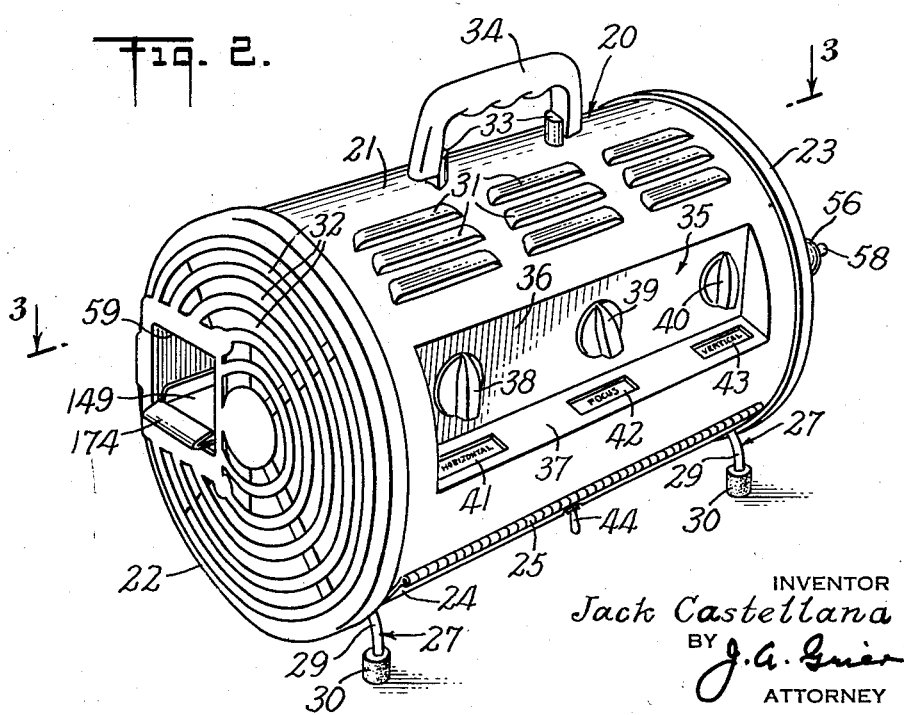

Referring first to Figures 1 and 2, the device is enclosed in a generally cylindrical casing 20 comprised of a tubular body 21 with abutting end plates 22 and 23. The bottom of the casing includes a door portion 24 having an elongated hinge 25 joining the body 21. On the other side, the door 24 carries a suitable latch 26. On each end are provided feet each of which consists of a metallic rod or bar 27 which is bent in the form of an inverted V with a rounded apex 28 upon which the projector is pivoted as best seen in Figure 3. The inverted legs of the V form feet 29 and they are capped with rubber or the like shoes 30.

The body 21 has a series of louvres 31 formed therein which together with a series of curved air passages 32 formed in the end plate 22 form exits for cooling air to pass out of the casing 20.

The body 21 also has a pair of spaced apart studs 33 to which a carrying handle 34 is pivotally connected.

A depression 35 in the wall of the tubular body has a vertical face 36 and a horizontal face 37, and extending through the wall face 36 are three spaced apart shafts (which will presently be described) carrying adjusting knobs 38, 39 and 40. On the face 37, below the knob 38 is a plate 41, which may carry, for example, the legend "Horizontal" and indicates that the images of the projected pictures are, by means of the knob 38, adjusted toward or away from each other.

Below the knob 39 is a plate 42 which may carry the legend "Focus," indicating that the knob 39 may be turned in either direction to focus the projected pictures simultaneously.

Below the knob 40 on the horizontal face 37 is a third plate 43 which indicates that the projected pictures may be moved up and down on a vertical path, as will presently be described herein.

A toggle switch 44 carried on the tubular body 20 has two positions, (1) where a cooling fan is energized, and (2) where the fan continues to operate and the projecting lamps are supplied with energy from a suitable source, the fan still continuing to operate, as will be explained in detail hereinafter.

On the opposite side, the body 21 carries a hood 45, which is hinged at 46 and held in position by means of a thumb screw 47. The hood has spaced apertures 48 and 49 formed therein, through which light from the objective lenses 50 and 51 respectively may pass.

A rectangular opening 52 in the end plate 23 communicates with a compartment to contain the slides to be projected. Within said compartment is a pressure plate 53 which functions to urge the slides toward the device for feeding them into position on the optical axis of the two objectives 50 and 51. Before loading the device with slides to be projected, the pressure plate 53 is manually urged to the right as seen in Figure 1 where it encounters a latch (to be presently described) and for releasing the pressure plate after loading, the operator presses a plunger 54, thereby allowing the pressure plate 53 to urge the slides toward the feeding position. For feeding the slides, mechanism, not shown in Figures 1 and 2 but to be presently described, is actuated by a push-pull rod 55 and to facilitate the operation of this rod, a knob 56 is secured on the end thereof. Concentric with the rod 55 is an inner rod, shown at 57 in Figure 8 for releasing a second set of filters which I employ in setting up the picture for projection. To actuate this inner rod, I provide a plunger 58 and term it a filter release plunger. The end plate 22 has a rectangular opening 59 which communicates with a second compartment which receives the slides after they have been projected. This compartment as well as the one with which the opening 52 described above communicates will be described in connection with Figures 6, 7, and 8.

Referring now to Figure 3, which is a section through the device as seen along the line 3—3 of Figure 2, the end plate 22 has a stud 60 which extends inwardly along the axis of the casing 20. This stud is centrally located in a boss 61 which is integral with the end plate 22. In contact with the boss 61 is a friction disc 62 and in contact with the friction disc is a metallic washer 63. Abutting the washer 63 is the rounded apex 28. In contact with the opposite face of the rounded apex is a second washer 63 which bears on a second friction disc 62 and bearing against the second friction disc 62 is a washer 64. Also on the stud 60 are spring washers 65 which bear against an adjusting nut 66, and a lock nut 67 is provided to retain any adjustment. The function of this arrangement is to provide an automatic leveling means for the feet 29, 30. On the other end plate 23, I provide substantially the same arrangement and consequently the same numerals for like parts also appear on the end plate 23. The knob 38 is secured on the end of a shaft 68 which extends through a bearing hole 70 in the face 36 and which also extends through a bushing 71 in the wall 69 and secured on the extremity of the shaft 68 by means of a screw and lock washer 72 is a crank member 73 which carries a crank pin 74. A connecting rod 75 has one end connected to the crank pin 74 and the other end of this connecting rod is connected to a lever 76 which is preferably formed integral with a block member 77 as may best be seen in Figure 9. The objective lenses 50 and 51 are carried in individual mounts 78 and 79 and are individually supported on plates 82 and 83 which are slidably carried between a plate 80 and a second plate 81. Clearance cut-outs 84 and 85 and the plates 82 and 83 respectively permit the lens mounts to be moved in a horizontal plane. The plate 82 carries a spring post 86 and the plate 83 carries a spring post 87 and joining these spring posts and urging them toward each other is a spring 88. Now since the block member 77 is between the plates 82 and 83, the spring 88 actually maintains the plates in contact with the block member at all times so that if the block member is moved in a clockwise direction about the shaft 89 upon which the block member is pivoted the opposite corners of the block member cam the plates 82 and 83 in opposite directions thereby the distance between the axes of the lenses is increased. When the block member 77 is moved in a counterclockwise direction, the plates 82 and 83 follow it up due to the urge of the spring 88.

As pointed out above, the indication on the panel 41 below the knob 38 indicates that this knob controls the horizontal distance between the pictures of any pair.

The knob 39 for focusing the device is mounted on a shaft 90 which is journaled in a hole 91 in the face 36 and in a bushing 92 carried in the plate 69 and secured on the extremity of the shaft 90 by means of a screw 93 is a nutating disc cam 94. Cooperating with the cam 94 is a stud 95 which is carried by a plate 96 which is secured to a support comprised of the plates 80 and 81. The support plate 80 carries a boss 97 which is counterbored to form a working fit on the shaft 89 which is supported between an inner front plate 99 which has apertures 100 and 101 for the objective lenses, by means of a screw 102 and the other end is supported by means of a screw 105 which passes through a wall 103 forming part of a rectangular casing 104. The wall 103 has apertures 106 and 107 in alignment with the objective lenses 50 and 51 respectively.

The front plate 99 forms one wall of an elongated casing 108 and this casing has a lower wall 109 and an upper wall 110. Opposite the plate 99 are spaced metallic plates 111 and 112 having edges 113 and 114, respectively and constitute rails upon which slide carrier 115 (to be presently described) is moved. The rod 55 slides longitudinally in a bushing 116 (Figure 4) which is mounted in an upturned ear 117. The slide carrier has an L-shaped extension portion 119 which has a tab 120 into which the shaft 55 extends. The shaft is threaded on its end and the tab 120 which has a clearance hole therein is clamped between nuts 121 which engage the rod or shaft 55. This rod is hollow and extending through it is a smaller rod 57 which has a portion 123 which extends at right angles thereto. The knob 56 has a counterbored hole 124 therein and the knob itself is secured on the shaft 55 by means of a nut 125 like the nuts 121 and a clearance hole 126 which is concentric with the hole 124 and provides communication between the hole 124 and the passage within the shaft 55 so that the inner shaft 57 can extend into the plunger 58. A spring 127 urges the plunger 58 to the right as seen in Figure 4, and the portion 123 cooperates with the elements on the slide carrier, which will presently be described.

The knob 40, for the vertical adjustment of the projected pictures, is mounted on a shaft 128 (see Fig. 3) which is journaled in a clearance hole 129 in the wall 36 and in a bushing 130 carried in the wall 69. Secured on the inner end of the shaft 128 by means of a screw 131 is a vertical channel 132 which carries a plate 133. The plate is adjustably mounted in the channel and it may be adjusted by loosening a screw 134. The plate has an offset portion 135 (see Fig. 7) which carries a crank pin 136. A connecting rod 137 has one end journaled on the crank pin 136, and between this point and the other end, the connecting rod 137 has an upwardly extending portion 138, a curved portion 139, a downwardly extending portion 140 and a horizontal extending portion 141, the extremity of which is bent in the form of a hook 142 which engages a hole formed in the plate 96. The plate 96 has a second hole 143 spaced apart from the hook 142 and one end of a spring 144 is connected to the hole 143 and the other end is connected to a spring post 145 mounted on the upper wall 110. Referring back to Figure 3, it will be noted that the shafts 68, 90 and 128 are each provided with washers 146 against which in each instance, a spring 147 bears, and a fixed ring 148 is set into a groove on each shaft and forms a bearing for one end of the spring 147 so that the latter frictionally engages the washer 146 and the bushing against which it bears with substantially uniform friction thereby softly yet firmly restraining the shaft associated therewith and thereby causing each shaft to remain in any adjusted position.

Referring now to Figures 8 and 9, it will be noted that the plate 96 is movable with the structure 81, 96, so that the rotation of the knob 40 causes the lens mounts to rotate about the axis 89, 98 and thereby one projected picture is raised as the other is lowered.

Referring now to Figure 8, the elongated casing 108, due to the presence of the rectangular casing centrally disposed therein forms a compartment 149 which is on the right hand side as seen in Figure 8 and a second compartment 150 which is on the left hand side as seen in Figure 8. The compartment 150 is utilized as a hopper into which the slides to be projected are placed.

Pivotally mounted within the compartment 150 is a plate member 151 having one end pivoted at 152 and having on its other end a pivot connection 153 with a second plate member 154, the latter having its extremities 154a and 154b curved and functioning as a pressure plate adapted to bear against any slide positioned within the compartment 150. The plate member 151 carries a latch member 155 and it has a slanting surface 156 to cam against a locking member, to be presently described, and it has a lateral notch 157, the action of which will also be presently described. Between the plate members 151 and 154 is an arcuate leaf spring 158 which urges the plate members apart when they are in the folded or slide-loading position. The second leaf spring 159 is secured to the wall 101 at the anchor point 160 and the other extremity 161 is folded back on itself and this is the end which bears against the plate member 151 and urges it from the solid to the slotted position. The wall 101 has a clearance slot 162 therein through which the latch member 155 extends when the plate array in the compartment 150 is moved to the loading position. The plunger button 54 has a shaft 163 which is movable endwise in aligned holes formed in a bracket member 164, and the bracket member in turn is secured on the outside of the wall 101. The bracket member 164 also has secured thereto a leaf spring member 165 which carries a tab 166 which extends into the lateral notch 157 in the latch member 155 and thereby retains the array of plate members and spring within the compartment 150 while the slides are being loaded into said compartment. The spring 165 exerts pressure against the end of the shaft 163. Now when the compartment 150 is loaded with slides the operator may depress the plunger 54 and thereby release the latch member 155 thereby allowing the array to urge the load of slides toward the slide carrier which will presently be described. Secured on the bottom wall of the compartment 150 is a spring member 167 by means of a block member 168 which is spot welded to the wall 108 on one end thereof. The other end of the spring 167 extends beyond the front edge 169 of the compartment 150 and has a portion 170 generally in the form of an A and it has a vertical edge 171 which extends downwardly and forms a stop which may be displaced by movement in the direction of the arrow. On the other end of the elongated casing is an identical spring-stop array and comprised of a spring portion 172 which has at one end thereof a block member 173 which is spot welded to the wall 109 and the other end of the spring 172 extends beyond the front edge 176 of the elongated compartment and has a portion 174 generally in the form of an A and it has a vertical edge 175 which extends downwardly and forms a stop which holds the projected slides within the compartment 149 from moving endwise. When it is desired to remove slides from the compartment 149 the spring 172 may be swung downwardly in the direction of the arrow in Figure 7 and thereby bringing the stop portion 175 below the floor of the compartment, leaving the slides free to be pulled out endwise.

The compartment 149 has a plate member 177 which is pivotally mounted within the compartment at 178. The plate 177 (Figure 8) is urged in a counterclockwise direction by means of a spring 179 which is secured to the casing in any suitable manner, for example, by spot welding.

The other end 181 of the plate member 177 is pivotally connected at 182 to a second plate member 183. Secured within the compartment 149 are spaced apart springs, one of which is shown at 184, and these springs urge the slides individually after they have been projected into contact with the face of the plate 183. Also carried in the compartment 149 are identical spaced apart bracket members 185 each of which has foot portions 186 and 187 for mounting them within the compartment 149 so that the main body portion 188 is normally parallel to the compartment wall 99. Each of the members 85 also has an angular surface 189 which together with the surface of the plate member 183 form an entering wedge for each projected slide, as it is moved into the compartment 149 and thus the projected slides are stacked against the urge of the spring 179.

Referring now to Figures 3 and 10, a series of rods 190 and 191 which are in horizontal alignment, and a rod 192 which is spaced apart vertically from the plane of the rods 190 and 191 which commonly support a series of plates 193, 194 and 195 are in spaced relation to each other. Spacing sleeves 196 on the several rods 190, 191 and 192 between the plates define this spacing and yet allow sufficient ventilation to effectively cool optical elements carried by these plates. Between the wall 69 and the extremity of the rod 190 is an elongated sleeve 197, and threadedly engaging the end of the rod 190 is a thumb nut 198. Likewise between the wall 69 and the extremity of the rod 192 is an elongated sleeve 199 and engaging the extremity 192 is a thumb screw 200. Between the wall 69 and the extremity of the rod 191 is an elongated sleeve 201 and retaining the sleeve 201 on the rod 191 is a thumb nut 202.

Adjacent to the wall 69 and between two adjacent sleeves 196 is a plate 193 which has three notches formed therein to clear the rods 190, 191 and 192 when the plate is pressed downwardly between the spaces 196 and the three thumb screws 198, 200 and 202 are loosened. The plate 193 carries condensing lenses 204 and 205 in spaced relation to each other, which are on the optical axes 206 and 207. The plate 194 is substantially identical and it carries three notches which clear the rods 190, 191 and 192 when this plate is inserted between adjacent spacer sleeves 196 adjacent to the plate 193. The plate 194 carries heat absorbing plates 203 and 208 in alignment with the condensing lenses 204 and 205, respectively. The plate 195 is inserted between the lowermost sleeves 196 on rods 190 and 191 and between a sleeve 209 and the lowermost sleeve 196 on the rod 192 and this plate carries condensing lenses 210 and 211. Now in order to clean the optical elements 204, 205, 203, 208, 210 and 211, the thumb screws 198, 200 and 202 may be loosened and the plates 193, 194 and 195 carrying these optical elements may be slid out from the assembly for cleaning and replacement purposes. Also carried on the rods 190 and 191 are spaced apart plates 212, 213, 214, 215, 216 and 217 and these plates are arrayed on said rods between a fixed nut 218 in contact with the plate 195 previously referred to and a fixed nut 219 on the rod 190 and between a nut 220 and a nut 221 on the rod 191, spacer 222 being provided on both the rod 190 and 191 between the plates 212 and 217 and a longer spacer 223 between the plate 217 and an adjacent plate 224 which will be presently described. The plate 212 has holes 225, 226 therein which are in alignment with the condensing lenses 210 and 211, respectively. Formed in the plates 213, 214 and 215 are spaced apart slots 227 and 228 having rounded apices 229 and 230, respectively, which are adapted to accommodate projection lamps. Bordering the right hand edge of the slot 228 as viewed in Figure 3 is an angular plate which has a flange portion 231 parallel to and substantially in contact with the said edge of the slot in the plate 215 and having an angular portion 232 which is spot welded or otherwise secured to the plate 214. A similar plate has an angular portion 233 which extends parallel to the inner edge of the slot in the plate 213 and having a flange portion 234 which is secured to the plate 214 so that its portion and the portion 232 may in fact be spot welded in one operation. The flanges 231 and 233 function as guards to prevent light from leaking laterally from a lamp in the slot 228 and also they serve as air deflectors to prevent strong air from blowing directly from the glass envelope of the projection lens in the last mentioned position and thereby reduces breakage of the glass envelopes. Secured on the left end of each of the plates 212 to 216, inclusive, is a series of deflector plates which are generally V-shaped in cross-section as shown at 235 and having an extension 236 thereon which is welded or otherwise secured to the left end of the plate 216 and like elements are also secured to the ends of the plates 216, 215, 214 and 213. Other deflector plates which are also generally V-shaped in cross-section are designated by the numeral 237 and are carried by a plate 238 which is secured on the flanged edge 238 of the wall 69.

A fan motor 239 is mounted on a plate 240 (Figure 11) and it carries on its shaft 241 a four-bladed fan 242 which is generally in alignment with the ends of the plates 193, 194, 195, 212, 213, 214, 215 and 216 so that when the fan is operating the optical elements carried by the plates 193, 194 and 195 are cooled so that the other plates 212 to 216 which pick up heat from the projection lamps 243 and 244 are cooled by this air the flow of which is retarded by the array of V-shaped elements 235 and 237. Carried on the plate 240 are sockets 245 and 246 which support the projection lamps 243 and 244, respectively. These sockets are covered by a housing 247 and within the housing are the extremities of a connector cord 248, and extending through the housing 247 is a portion of a double throw-switch 249 having an operating lever 250 by means of which the fan may be operated in the two active positions, and the projection lamps being operated in one of the positions of said lever. Wires 251 and 252 lead from the connector cord 248 and from the switch 249 to the fan motor 239. The thumb nuts 253 are provided for loosening and removing the plate 240 so that the lamps 243 or 244 may be replaced in case they burn out.

Referring now to Figures 4, 5 and 6, a slide carrier 115 is slidably mounted on the edges 113 and 114 of the plate portions 111 and 112, respectively, and this carriage comprises a plate portion 256 having a rectangular opening 257 formed therein and having edges 258 and 259 which are positioned beneath the edges or guides 113 and 114 and are maintained in cooperative relation with said guides by means of a plate 260 which is spot welded to or otherwise secured to the plate portion 256. It will be understood that the edges 258 and 259 are below the guide edges 113 and 114 and the extremities of plate 260 are above the guide edges 113 and 114 as seen in Figure 4. Thus the carriage is slidably retained on the metallic plates 111 and 112. The plate portion 255 has a flat channel portion 261 a portion of the lower surface of which is in contact with and slides upon the surfaces of the metallic plates 111 and 112 as seen in Figure 4. The plate member 255 also has lateral offset flange portions 262 and 263 comprising opposite edges of the plate member 255 and the function of which will be presently described. The flat channel portion 261 is spot welded to the plate member 256 at points indicated by the numeral 263. A spring has a body portion 264, which is secured to the surface of the flat channel portion 261 in any suitable manner, for example, by rivets, and it has a free resilient arm portion 265 which bears upon the flat surface portion 266 of a presser foot 267. The presser foot 267 has an apex 268 which extends inwardly and clears the wall 103. On the base portion opposite the apex and in alignment with the surface 266 is a narrow surface 269. The presser foot 268 is pivotally mounted in the opposed flange portions 262 and 263 by extensions 277 and 278 which are mounted in aligned holes formed in said flange portions, one of which is seen at 279 in Figure 8.

Fixedly mounted on the flange portions 262 and 263 (Figs. 4, 5, and 6) is a filter frame member 270 which includes three rectangular openings, namely, frames 271, 272 and 273. Fixedly mounted in the frame 271 is a "Polaroid" filter 274 in which the striations are disposed at an angle of 45° and mounted in the frame 273 is a "Polaroid" filter 275 in which the striations are disposed at an angle of 45° with the horizontal and 90° with respect to the striated filters 274 and these filters are used both for adjusting the images on the screen and for viewing the images. However in the first instance, auxiliary filters are superimposed on the first mentioned filters during the adjustment period and they will be presently described. Beneath the filter frame 270 is slideably carried a second filter frame 276 having rectangular openings 280, 281 and 282. Within the opening 280 is a "Polaroid" filter element 283 in which the striations are disposed horizontally and within the opening 282 is mounted a "Polaroid" filter 284 in which the striations are also horizontal. In Figure 6 the auxiliary filter frame 276 is shown in the viewing position wherein the auxiliary filters 283 and 284 are displaced from the optical axes leaving the filter 275 in alignment with the other.

When the pictures are first thrown on the screen, the auxiliary filter frame 276 is in the position shown in Figure 5 wherein both the auxiliary filter 283 and the viewing filter 275 are in alignment on the optical axis of the lens 50 and the auxiliary filter 282 and the viewing filter 274 are both on the optical axis of the lens 51. With these filters in the positions shown in Figure 5, the images projected on the screen through said filters are adjusted both horizontally, vertically and are also focused on the screen, following which the auxiliary filters are removed from the optical axes and the superimposed pictures may then be viewed through "Polaroid" glasses. The mechanism for quickly removing auxiliary filters from the optical axes is comprised of the auxiliary filter carrier or slide 276 which has a tab extension 285 secured to the slidable auxiliary frame 276. Secured to an upright portion 286 of this tab is an L-shaped member 287 which has one leg 288 extending parallel the movement of the filter carrier 276 which has a hole therein engaged by one end 289 of a spring 290 the other end of the spring 290 is connected to a spring post 291 on the fixed frame 270 so that the auxiliary filter carrier 276 is urged to the left as seen in Figures 4, 5 and 6 at all times. The L-shaped member 287 has a leg 292 which extends laterally of the filter carrier 270 and it is in longitudinal alignment with a flat spring 293 (Figure 4) which is secured on a plate member 294 by means of screws 295 extending through elongated holes 296 formed in the body of the spring 293 so that the spring 293 may be adjusted longitudinally relative to the portion 292 of the L-shaped member 287. The extremity 297 of the spring 293 is curved downwardly so that it may engage the portion 292 and arrest the auxiliary filter frame in a position where its auxiliary filters are in alignment with the main viewing filters 275 and 274.

In alignment with the bent portion 123 is an arm 298. This arm has a portion 299 which is mounted on the fixed filter frame member 270 and extends longitudinally toward the portion 123 of the inner shaft or rod 122, and this arm has a curved end portion 300 which is in alignment with and preferably in contact with the portion 123 so that when the button 58 on the end of the shaft 122 is depressed, the end portion 300 is cammed upwardly or raised.

Carried on the bracket 118 is an angular body 302 which has an extension 303 which extends over the angular portion 123 of the push rod 122 and functions to hold it against lateral displacement.

Referring now to Figure 8, a bell crank 304 is pivotally mounted beneath the wall 103, the pivot being shown at 305. One arm 306 of this bell crank has one end of a spring 307 secured thereto and the other end of this spring is secured to a cross frame member 308 (which functions to define the end wall of the compartment 150). The other arm 309 of the bell crank carries a ratcheting tab or ear 310 which is normally positioned in the path of a slide and as it enters the slide carriage is depressed as the slide is passing over it and just as the slide does pass over it, this tab rises due to the urge of the spring 307 and the edge 310a thereof forms a locating stop for the slide and holds it in the proper relation to the two axes of the optical system. By this arrangement I can handle slides of different thicknesses. A leaf spring means 311 which is secured on the wall 103 adjacent to the left end (as seen in Figure 8) urges the slide in the projecting position into intimate contact with the adjacent wall of the slide carrier 115.

The above mentioned features may best be seen in Figure 12. The arm 298 has a depending hook-like element 301 which is engaged and latched by the tab extension 285 when the carriage is moved to the left as seen in Figure 4. This is due to the fact that the stationary spring 293 is engaged by the leg 292 and it is held against movement as the carriage is moved further to the left as seen in Figure 4 until the hook-like element encounters and rides over the tab extension 285. As soon as it rides over the tab extension the vertical edge of the hook element engages the left hand edge of the tab extension as seen in Figures 4 and 12 and the filters in the auxiliary filter carriage 276 are beneath and in axial alignment with the filters in the filter frame member 270 so that when the carriage 115 has been moved to its extreme position, the superimposed filters are in alignment with the two optical axes and if there is a slide positioned in the carriage the light passing through the pictures in the slide is influenced by both said filters and it is during that period that the horizontal and the vertical adjustment of the images on the screen, and the focusing if necessary, are effected. Now after the desired adjustments have been made, the release plunger 58 is depressed and the inner shaft 122 is thereby pushed to the left, as seen in Figure 4, and thereby the extremity 300 of the arm 298 is raised in a manner best seen in Figure 12 and thereby the auxiliary slide 276 is released and is pulled by the spring 290 to the position shown in Figure 6 wherein the filter 274 is on the optical axis of the lens 50 and the filter 275 is on the optical axis of the lens 51 and the superimposed picture on the screen may then be viewed through "Polaroid" glasses with the striations running in the corresponding directions.

In the modification, Figures 13 and 14, the filter frame member 270 has rectangular frame openings 271, 272 and 273, but the main polarizing filters 274 and 275 are omitted, thus all three of these openings are wide open.

The slidable second filter frame 276 is below (as seen in Figures 13 and 14) and is slidable relative to the member 270, and it carries rectangular openings 280 and 281. Spanning the opening 280 is a main filter 312, while spanning the opening 281 is a main filter 313.

The filter frame 276 has a push-pull element 316 secured thereto, for example by means of escutcheon pins 317, and it carries on its outer end a knob 318. Secured on the right end of the filter frame member 270 is a stop 319 which extends downwardly, seen in Figures 13 and 14, sufficiently to engage the right end of the filter frame 276 and stop it in registration with the optical axes of the projectors and consequently with the objective lenses 50 and 51.

It will be noted that the spring, the latch and other elements shown in Figures 5 and 6 are not used in the modification just described, however the members 270 and 276 move with the slide carrier 115 as it is actuated in either direction by means of the knob 56.

When the slide carrier 115 is actuated to bring a slide from the compartment 150 to the respective optical axes the filter frame carrying the filters 312 and 313 is left in the relative position shown in Figure 13, free of the optical axes. The operator then adjusts the projected images by means of the knobs 38 and 40, and the focusing knob 39 if necessary to produce two sharp coinciding images on the screen. Then the filter frame is pushed toward the right by means of the element 316, until it is arrested by the stop 319, and a stereoscopic picture can be viewed by an audience wearing the proper filter "glasses."

The modification shown in Figure 15 is intended to be mounted on the slide carriage 115 in place of the filter carriers 270 and 276 shown in Figures 5 and 6. The arrangement includes a plate member 320 which is generally rectangular in form and which has a pair of spaced apart rectangular openings 321 and 322 which are positioned in alignment with the pair of optical axes in the projector so that the objective lenses 50 and 51 thereof substantially are centralized within the rectangular openings. Set into the plate 320 in any suitable manner are two spaced apart annulae which are in the form of thin wafers one wafer being shown at 323 and the other at 324. Each wafer has, as stated above, a portion thereof set into the plate and rotatably retained thereon. The wafer 323 has teeth 325 thereabout and likewise the wafer 324 has teeth 326 thereabout and in alignment with the teeth 325 and 326 are teeth in the form of a rack 327 which meshes with the teeth 325 and a rack 328 which meshes with the teeth 326. The teeth 327 and 328 are formed integral with an elongated strip 329 which has aligned slots 330 and 331 formed therein. These slots form working fits on respective headed studs 332 and 333 which are secured to the plate 320 by riveting, for example. Thus these elements form in cooperation with the elongated slots means for guiding the strip 329 along on the surface of the plate 320. The strip has an extremity 334 formed integral therewith and which carries adjacent to the end thereof a knob or button 335. Mounted in the wafer 323 is a polarizing filter 336 and mounted in the wafer 324 is a polarizing filter 337. However the normal position of the filter 336 as shown in Figure 15 is with the striations in a horizontal position. The filter 337 as shown in Figure 15 is with the striations in a vertical position.

Now with the filter set as above described, it is assumed that a slide is moved to a projecting position with one frame in alignment with the filter 336 and the other in alignment with the filter 337. Filters 336 and 337 change the polarization of the two light beams, one to a vertical direction, the other to a horizontal direction; each being rotated 45 degrees from the axes of the polarizing glasses worn by the observers. In this condition the observed brightness is considerably diminished but each of the observer's eyes can see both images. The operator may now make the proper adjustments of focus and relative alignment. Now with pictures properly superimposed and focused, the operator pushes the strip 329 to the left (by pushing the knob 335) and thus the movable elements assume the positions shown in Figure 16 wherein the filters 336 and 337 have been rotated from horizontal and vertical polarizing positions to 45 degree polarizing positions, with the result that the audience may now view the picture through a "pair of glasses" and view the images stereoscopically. In this arrangement the filters 336 and 337 when in the horizontal and vertical positions cut the strength of the light on the screen down to some extent while the arrangement shown and described in connection with Figures 13 and 14, the light shines upon the screen at full strength when the adjustments are being made and when the filters are positioned on the optical axes so as to polarize the superimposed images, the light on the screen is slightly less brilliant. However, all of the forms of the invention shown herein enable the operator to project stereoscopic images and with a minimum of eye strain upon the viewers.

Although I have herein shown and described by way of example one embodiment of the invention and several modifications thereof, it will be understood that the examples and modifications shown are not intended to be limitative as many changes may be made within the scope of the following claims.

I claim:
1. A stereoscopic projector comprising, a pair of optical systems mounted in a housing spaced apart from each other and adapted to project a pair of light beams onto a viewing screen, means for mounting a pair of transparencies in the paths of said beams, optical means secured to said housing for focussing light transmitted by said transparencies onto said screen, a first polarizing means for polarizing the light beams so that the direction of polarization of said two beams differs by 90 degrees, and a second polarizing means removably mounted in said housing for manual disposition into and out of the path of said light beams and adapted to change the direction of polarization of each beam, said second polarizing means adapted for temporary application while the images projected by the optical means are being focussed and aligned.

2. A stereoscopic projector comprising, a pair of optical systems mounted in a housing spaced apart from each other and adapted to project a pair of light beams onto a viewing screen in superimposed position, a slide holder for inserting and removing a pair of transparencies in the paths of said beams, optical means secured to said housing for focussing light transmitted by said transparencies onto said screen in superimposed position, a first polarizing means for polarizing the light beams so that the direction of polarization of said two beams differs by 90 degrees, and a second polarizing means removably mounted in said housing for manual disposition into and out of the path of said light beams and adapted to change the direction of polarization of each beam by 45 degrees, said second polarizing means adapted for temporary application while the images projected by the optical means are being focussed and aligned.

3. A stereoscopic projector as set forth in claim 2 wherein said optical systems each include a projection lens, said lenses disposed in horizontal alignment and mechanically movable together for focus adjustment.

4. A stereoscopic projector as set forth in claim 2 wherein said second polarizing means is mounted on a slide holder in the housing and is moved into and out of the path of said beams independently of other projector components.

References Cited in the file of this patent
UNITED STATES PATENTS

| | | |
|---|---|---|
| 2,268,338 | Kober et al. | Dec. 30, 1941 |
| 2,297,532 | Brost et al. | Sept. 29, 1942 |
| 2,525,598 | Gruber | Oct. 10, 1950 |
| 2,580,874 | Wottring | Jan. 1, 1952 |
| 2,746,345 | Graves | May 22, 1956 |
| 2,789,462 | Forgrave | Apr. 23, 1957 |

FOREIGN PATENTS

| | | |
|---|---|---|
| 926,712 | Germany | Apr. 21, 1955 |